(12) United States Patent
Batoha

(10) Patent No.: US 7,134,603 B2
(45) Date of Patent: Nov. 14, 2006

(54) TRANSPARENT TRANSACTION CARD AND METHOD FOR MAKING A TRANSPARENT TRANSACTION CARD

(75) Inventor: Anthony Batoha, Littleton, CO (US)

(73) Assignee: CPI Card Group-Colorado, Inc., Littleton, CO (US)

( * ) Notice: Subject to any disclaimer, the term of this patent is extended or adjusted under 35 U.S.C. 154(b) by 0 days.

(21) Appl. No.: 09/949,263

(22) Filed: Sep. 7, 2001

(65) Prior Publication Data

US 2003/0047615 A1 Mar. 13, 2003

(51) Int. Cl.
*G06K 19/06* (2006.01)

(52) U.S. Cl. .................................. 235/491; 235/487
(58) Field of Classification Search ............... 235/487, 235/491
See application file for complete search history.

(56) References Cited

U.S. PATENT DOCUMENTS 6,296,188 B1 * 10/2001 Kiekhaefer ................. 235/491

\* cited by examiner

*Primary Examiner*—Harold I. Pitts
(74) *Attorney, Agent, or Firm*—Ira M. Siegel

(57) ABSTRACT

The invention is a transaction card having a base comprising a core of substantially transparent material with a plurality of coats, on at least one of the core's surfaces, of a material which is substantially transparent to humanly visible light and which is opaque to light in the infrared portion of the light spectrum. The invention is also a method for manufacturing a transaction card having an area which is substantially transparent to humanly visible light and which may be detected by card readers, such as ATMs and card printers. The method includes the steps of forming a core of substantially transparent plastic and applying a plurality of coats of material to at least one surface of the core, which material is substantially transparent to humanly visible light and which is opaque to light in the infrared portion of the light spectrum.

46 Claims, 6 Drawing Sheets

TRANSPARENT TRANSACTION CARD AND METHOD FOR MAKING A TRANSPARENT TRANSACTION CARD

BACKGROUND OF THE INVENTION

1. Field of the Invention

This invention relates to transparent credit cards, membership cards, identification cards and other transaction cards which may be detected by currently available card printing machines, automatic teller machines and other card readers.

2. Prior Art

Credit cards have been in use since 1950.

Over the years, the basic appearance of credit cards has not changed significantly. Generally, a credit card is sized at about 3.375 inches wide by about 2.125 inches high by about 0.03 inch thick in order to fit into a typical wallet. The card has a base formed of polyvinyl chloride, polycarbonate or similar plastic material which may be cured such that the card has appropriate characteristics of rigidity and flexibility to withstand the rigors a typical card is expected to endure.

Alphanumeric indicia, which typically identify the card issuing entity and the person to whom the card is issued, are embossed on the card for, among other things, creating an imprint on credit card transaction forms. A magnetic strip is usually embedded in or adhered to the back surface of the card. The magnetic strip is magnetically encoded with information relating to the entity issuing the card and/or the person to whom the card is issued, which information may be read by card readers in automatic teller machines ("ATMs"), point of purchase card readers at cashier counters in stores, identification card readers and the like. A signature strip, for receiving the card carrier's signature, is printed on or adhered to the back surface of the card as well. Very recently, some credit card issuers have embedded computer chips in their credit cards.

In addition, a typical credit card has other matter, visibly perceptible to the human eye, printed on the front and/or back surfaces of the card by silkscreening, offset lithography or other printing processes. The other matter printed on the front and back surfaces of the card may include information such as the name of the person to whom the card is issued, the name address and telephone number of the issuing entity, pictures, such as of the intended card holder, and holograms and logotypes associated with the issuing entity and other information or aesthetic matter.

Many identification cards, including store membership cards and company and school identification cards, now have the same or similar characteristics as credit cards. So do driver licenses as well.

In the 1950s there were only a few credit card issuers and few people obtained any credit or other cards at all. Today, hundreds of entities issue credit cards, and the average adult carries several credit and/or identification cards and a driver license.

Entities which issue credit cards vigorously compete with each other. In addition to the financial terms in connection with which their cards may be used and the venues which will accept the cards, credit card issuers use their cards' aesthetic characteristics to achieve a competitive edge.

A feature which could provide an aesthetic characteristic is transparency. Efforts at making transparent credit cards have been considered in the past. For example, a credit card having a substantial portion of its area transparent is disclosed in U.S. Pat. No. 3,725,647, titled "Photographic Credit Card System," issued to Clarence Retzky on Apr. 3, 1973.

Efforts to make, in commercially significant volumes, credit cards having a substantial portion of their area transparent, particularly along the edges of the credit cards, have been unsuccessful. That is because such cards have not been detectable in currently available card printing machines, ATMs or other card readers.

Sensors in such machines and readers detect the presence of a card when a light beam aimed at the sensor is blocked by the card itself. That is, when sensors detect light surrounding a predefined boundary at the same time that no light is detected within such boundary, the machine or reader detects the presence of a card. When the card is detected, a printing and/or reading operation is conducted. (In modern machines, the printing operation may also include the application of magnetic strip and a signature strip, and the embedding of a computer chip on or into the base of the card.) A transparent card, however, passes light through it, so the sensors fail to detect the presence of such a card, and no printing and/or reading operation occurs. Because transparent cards are not detected, a transparent card may jam current printing and reading machines (collectively referred to herein as "card readers").

No matter how aesthetically pleasing a transparent credit card might be, it is of little use if an issuing entity cannot print its name and logo on it or if the card cannot be read in ATMs or other card readers.

So, credit cards, identification cards, membership cards, driver licenses and similar cards (referred to collectively herein as "transaction cards") have been made from an opaque plastic, usually colored white, with information, aesthetic matter magnetic strips, signature strips and/or computer chips printed on or otherwise applied to the base of the card as described above.

Nevertheless, a strong desire has persisted among card issuing entities to be able to issue transaction cards having a significant area which is transparent. As discussed below, aesthetically transparent transaction cards (i.e., cards which are transparent to humanly visible light) can be detected by typical card readers if the card, though transparent to humans, is opaque in at least a portion of the infrared region of the light spectrum. In addition, the inventor has discovered a method to efficiently an economically manufacture cards which are transparent to the human eye but which are detectable by card printing and reading machines.

SUMMARY OF THE INVENTION

The invention is a transaction card having a base comprising a core of substantially transparent material with a plurality of coats, on at least one of the core's surfaces, of a material which is substantially transparent to humanly visible light and which is opaque to light in the infrared portion of the light spectrum. The invention is also a method for manufacturing a transaction card having an area which is substantially transparent to humanly visible light and which may be detected by card readers, such as ATMs and card printers. The method includes the steps of forming a core of substantially transparent plastic and applying a plurality of coats of material to at least one surface of the core, which material is substantially transparent to humanly visible light and which is opaque to light in the infrared portion of the light spectrum.

DETAILED DESCRIPTION OF THE INVENTION

Figure 1:
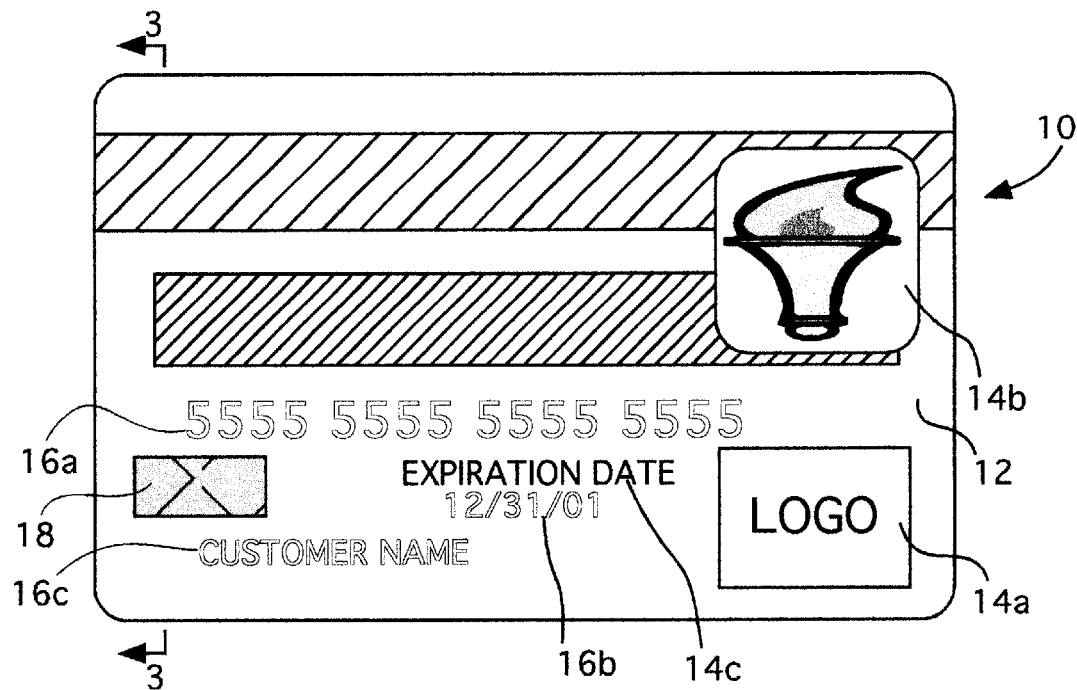
FIG. 1 is a front plan view of a transaction card of the present invention.
Figure 2:
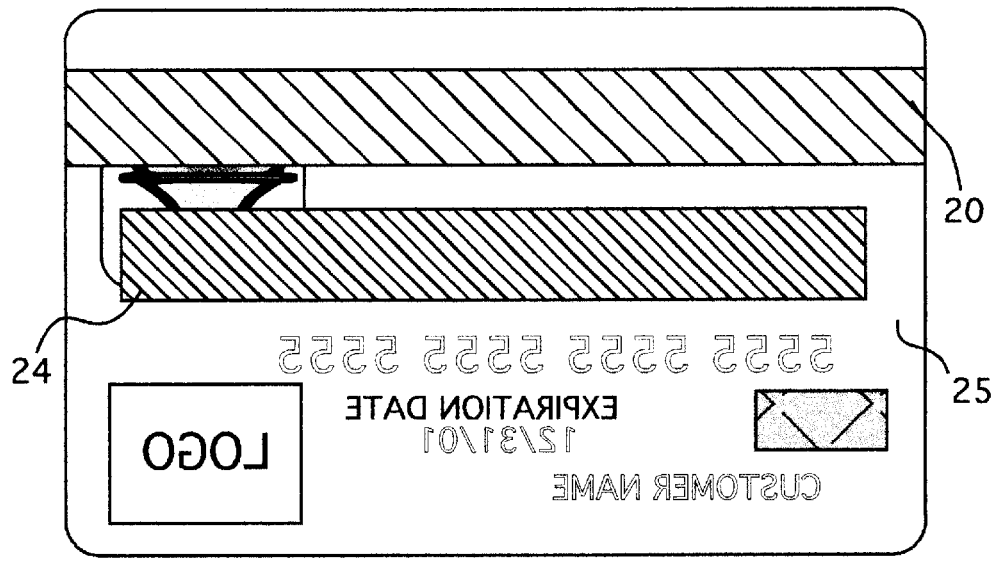
FIG. 2 is a rear plan view of a transaction card of the present invention.

The preferred embodiments of the subject invention are illustrated in the attached drawings which are referred to herein. The same reference numeral will be used to identify identical elements throughout the drawings.

As discussed above, ordinary transparent transaction cards are not detectable by ATMs and other card readers; and ordinary transparent transaction card bases are not detectable in card readers such as card printers and similar manufacturing machinery. The inventor has discovered that the sensors of many current machines react to the presence or absence of infrared light having wavelengths in the range from about 750 nm to about 1000 nm.

A preferred embodiment of the invention is illustrated in FIGS. 1, 2, 3, 4 and 5. It is a transaction card 10 having a base 13 comprising a substantially transparent card core 21 with at least first and second infrared barrier layers 22 and 23 applied to a surface of the core. The term "infrared barrier layer" shall be understood herein to mean a layer which is substantially transparent to humanly visible light and substantially opaque to at least one range of wavelengths of infrared light. The infrared barrier layer is formed from a transparent liquid vehicle mixed with one or more infrared blocking agents. The transparent liquid vehicle may be a humanly visually transparent dye, ink, solvent or varnish or other clear liquid, or a combination thereof. The blocking agents may be dyes, pigments or other materials or combinations thereof which reflect or absorb infrared light and are substantially transparent to humanly visible light. An infrared barrier layer may block the passage of infrared light rays by reflecting such rays, absorbing such rays, or by both absorbing and reflecting such rays. So, unless otherwise specified, "block" will be used to mean "reflect" and/or "absorb."

In the preferred embodiment of card base 13, first and second infrared barrier layers 22 and 23 are applied to opposite surfaces of the card core. Protective layers 25 (which may be clear plastic laminate) are applied over the infrared barrier layers 22 and 23.

Figure 3:
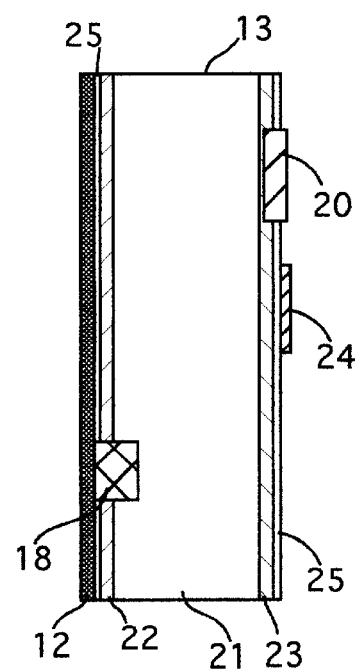
FIG. 3 is a cross sectional view of the transaction card of FIG. 1, taken along line 3—3, with the thickness of the card being exaggerated with respect to the height of the card.
Figure 5:
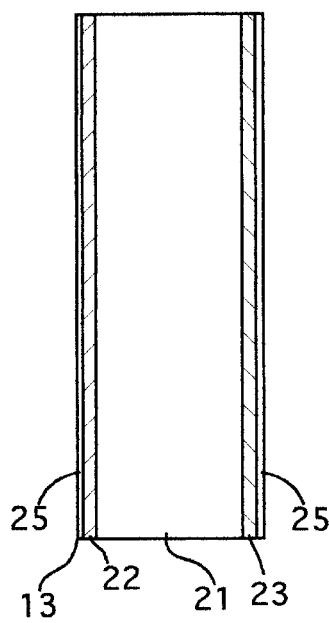
FIG. 5 is a side view of a card base formed pursuant to the present invention, with the thickness of the card base being exaggerated with respect to the height of the card base.

The inventor has discovered that few, if any, infrared blocking dyes, pigments or other agents effectively block all infrared rays across the required wavelength range. To the extent, if any, that an infrared blocking agent may exist which could block the entire range of wavelengths required to be blocked so that a transaction card or a card base could be detected in card readers, such agent would likely be too expensive for practical use. The inventor has also discovered that combining in a single infrared barrier layer a plurality of agents having properties which together would appear to provide for the blocking of infrared rays across the entire required wavelength range may be difficult or impossible to achieve or, if such agents could be combined together, the resulting combination may have the opposite effect. That is, multiple dyes and/or pigments or other agents may react with each other such that significant discontinuities in the target wavelength range appear. The inventor has overcome this problem by applying a plurality of separate infrared barrier layers to a transparent card core as shown in FIGS. 3 and 5. Each infrared barrier layer blocks a different range of infrared wavelengths. When the ranges are added together, the required total range of infrared wavelength blocking capacity is reached. To the extent that the wavelength range blocked by one infrared barrier layer overlaps with the wavelength range blocked by another infrared barrier layer, the result is beneficial.

The preferred embodiment of card base 13 is shown in FIG. 5. Core 21 is formed of polyvinyl chloride, polycarbonate or similar plastic material in the conventional manner, except that the polyvinyl chloride, polycarbonate or similar plastic material is substantially transparent.

Each of infrared barrier layers 22 and 23 is coextensive with substantially the entire area of the transaction card, and is substantially transparent to humanly visible light and substantially opaque to light in a range or ranges of wavelengths in the infrared portion of the spectrum. In particular, the combination of infrared barrier layers 22 and 23 is substantially opaque to light having wavelengths from about 750 nm to at least about 1000 nm.

First infrared barrier layer 22 is preferably formed of one or more infrared absorbing dyes, one or more infrared reflecting pigments and/or other infrared blocking agents, which usually are available in powdered form, mixed in a clear liquid vehicle.

Second infrared barrier layer 23 is also preferably formed of one or more infrared absorbing dyes, one or more infrared reflecting pigments and/or other infrared blocking agents, which usually are available in powdered form, mixed in a clear liquid vehicle.

In a preferred embodiment, the combination for the first infrared barrier layer is, by weight, 7.5% pthalocyanine derivative dye, an infrared absorbing dye (the inventor uses the dye currently sold under the nomenclature "Pro-Jet 900" by Avecia International (P.O. Box 42 Hexagon House, Blackley, Manchester M9 8ZS, United Kingdom)), and 92.5% solvent-based clear liquid vehicle.

A preferred source of a solvent-based clear vehicle is Apollo Colour of London, United Kingdom.

This combination provides for the blocking of infrared rays in approximately the 880 nm to 940 nm range by first infrared barrier layer 22.

In a preferred embodiment, the combination for the second barrier layer is, by weight,

- 1.25% benz[e]indol cyanine dye, an infrared absorbing dye (the inventor uses in approximately equal parts two dyes currently sold under the nomenclatures "SDA4927" and "SDA8440" by H. W.Sands Corp. (1080 E. Indiantown Road, Suite 206, Jupiter, Fla. 33477) to make up this portion of the combination)),
- 1.25% infrared reflecting pigment having the same properties as the pigment currently sold under the nomenclature "K" by Stardust Materials (4278 Arthur Kill Road, Suite A, Staten Island, N.Y. 10309),
- 1.25% infrared reflecting pigment having the same properties as the pigment currently sold under the nomenclature "Z" by Stardust Materials, and
- 96.25% water-based clear liquid vehicle.

A preferred source of a water-based clear liquid vehicle for this embodiment is Sericol Limited (1101 West Cambridge, Kansas City, Kans. 66110).

This combination provides for the blocking of infrared rays in approximately the 740 nm to 925 nm range by second infrared barrier layer 23.

The total range of wavelengths blocked in the aggregate would be from about 740 nm to about 940 nm.

In another, currently more preferred, embodiment, the combination for the first infrared barrier layer is, by weight,

- 4% dibutyl amino thpenyl benzene, hexa antimonate dye, an infrared absorbing dye (the inventor uses the dye currently sold under the nomenclature "SDA7816" by H. W.Sands Corp.), and
- 96% solvent-based clear liquid vehicle.

A preferred source of a solvent-based clear vehicle is Apollo Colour of London, United Kingdom.

This combination provides for the blocking of infrared rays in approximately the 810 nm to 1000 nm range by first infrared barrier layer 22.

In this embodiment, the combination for the second barrier layer is, by weight,

- 7% benz[e]indol cyanine dye, an infrared absorbing dye (the inventor uses the dye currently sold under the nomenclature "SDA4927" by H. W.Sands Corp.), and
- 93% water-based clear liquid vehicle.

A preferred source of a water-based clear liquid vehicle for this embodiment is Thornley Company (500 East Newport Pike, Suite 204, Wilmington Del. 19804-2346).

This combination provides for the blocking of infrared rays in approximately the 720 nm to 890 nm range by second infrared barrier layer 23.

The total range of wavelengths blocked in the aggregate would be from about 720 nm to about 1000 nm.

Note that with current card readers the upper range of the blocked wavelength range can be anything above about 1000 nm. That is, the required range of wavelengths to be blocked is from about 750 nm to about 1000 nm. If wavelengths above about 1000 nm are blocked, cards made pursuant to this invention would work well in card readers. If wavelengths below about 750 nm are blocked, the cards would still work in card readers but the transparency of the cards may be effected. The inventor has found that blocking wavelengths as low as about 720 nm does not significantly negatively effect the transparency of the cards, while assuring that all the shorter wavelengths which should be blocked are blocked.

First infrared barrier layer 22 is applied to one surface of card core 21 and second infrared barrier layer 23 is applied to the other surface of card core 21 using offset lithographic or silkscreening processes known in the field. In a preferred silkscreening process, a 390 mesh screen is used in applying the barrier layers to the card core. Each infrared barrier layer would be about 56 microns thick (about 0.0022 inches) when applied wet (and which dries to a much thinner layer), which is generally results in a layer having sufficient thickness to block infrared light in card readers. However, if a thicker barrier layer is desired, a 230 mesh screen may be used. In practice, the desired thicknesses of an infrared barrier layer would be chosen in view of the highest transmission density of the infrared light beams used in the card reading machines (including card manufacturing and printing machines, point of sale card readers, and ATMs) through which the card core (either itself or as a part of credit card, identification card or other card) is expected to pass (i.e., thicker infrared barrier layers would be used in cards expected to pass through card readers using higher transmission densities. Today, most card readers use a transmission density of about 1.3.

Generally speaking, the narrower the range of wavelengths blocked and the thinner the infrared barrier layer is, the lower the cost of making cards pursuant to this invention.

In a preferred embodiment, a clear plastic laminate is coated (by offset lithographic printing, silkscreening or other known processes) over the surface of each of the first and second barrier layers which is opposite to the card core to form protective layers 25 to complete the preferred embodiment of card base 13 as shown in FIG. 5.

The card base is then processed in conventional card manufacturing/printing machinery to embed a magnetic strip 20 in, and apply signature strip 24 on, the rear surface of the card base, to embed a computer chip 18 in the front surface of the card base, and to print front layer 12 onto the front surface of the card base as shown in FIG. 3. Front layer 12 will typically include printed information 14a–c relating to the issuing entity (e.g., a bank when transaction card 10 is a credit card) and/or the intended card holder, such as a logotype 14a associated with the issuing entity, a picture or hologram 14b and descriptions 14c of portions of the card. Otherwise, front layer 12 is substantially transparent. The card is also embossed by such machinery to include embossed information 16a–c, such as numeric characters 16a which identify the card issuing entity and the person to whom the card is issued, expiration date information 16b and card holder name information 16c.

Figure 4:
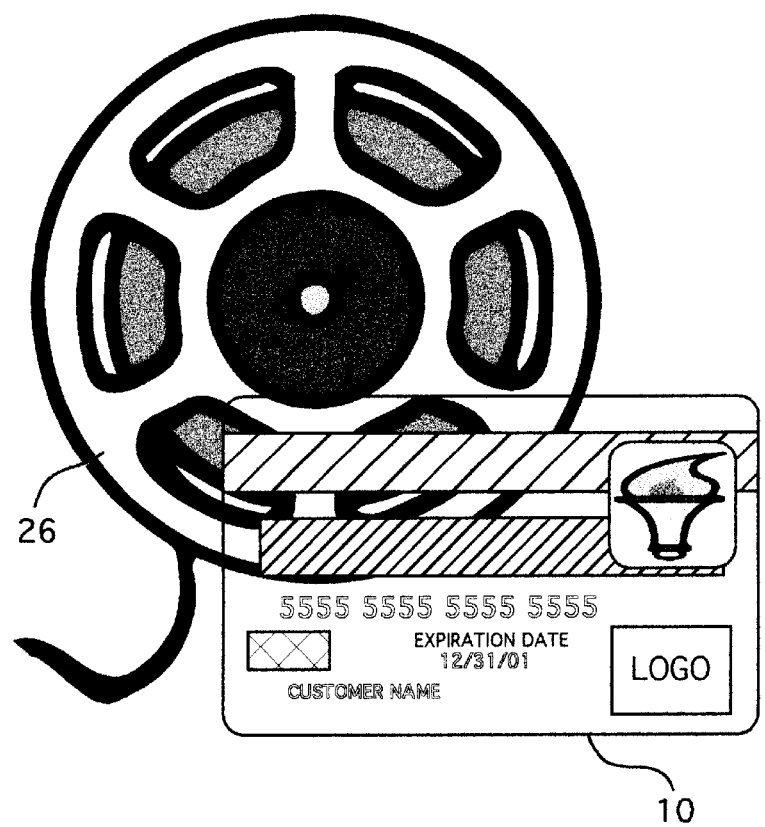
FIG. 4 is a front view of a transaction card of the present invention disposed in front of a reel of film, illustrating the transparent nature of the transaction card.

FIG. 4 illustrates the transparent nature of card 10. But for the picture, logo, computer chip, signature strip, magnetic strip and printed information, an object (here a reel of film 26) behind the card can be seen through the card.

Figure 6:
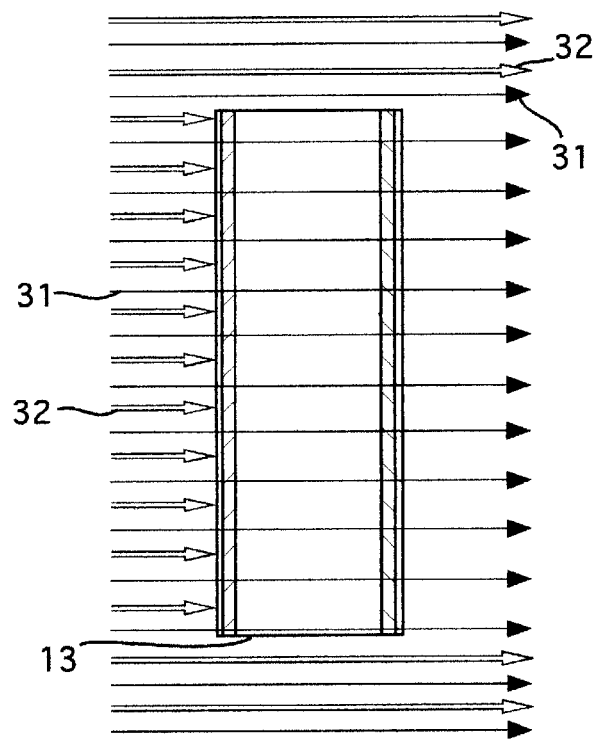
FIG. 6 is a side view of a card base formed pursuant to the present invention, with the thickness of the card base being exaggerated with respect to the height of the card base, with hollow and solid arrows illustrating the permeability of the card base to light in the infrared and humanly visible portions of the spectrum, respectively.

FIG. 6 illustrates the light permeability of the card base made pursuant to the invention described herein. Hollow arrows 32 represent light in the infrared range of the spectrum and solid arrows 31 represent light in the remaining portions of the spectrum.

Light from a source (not shown) to the left of the card base shines toward a sensor (not shown) to the right of the card base. The card base substantially blocks the infrared light, while allowing the remaining light to pass through to the sensor which detects the card.

Figure 7:
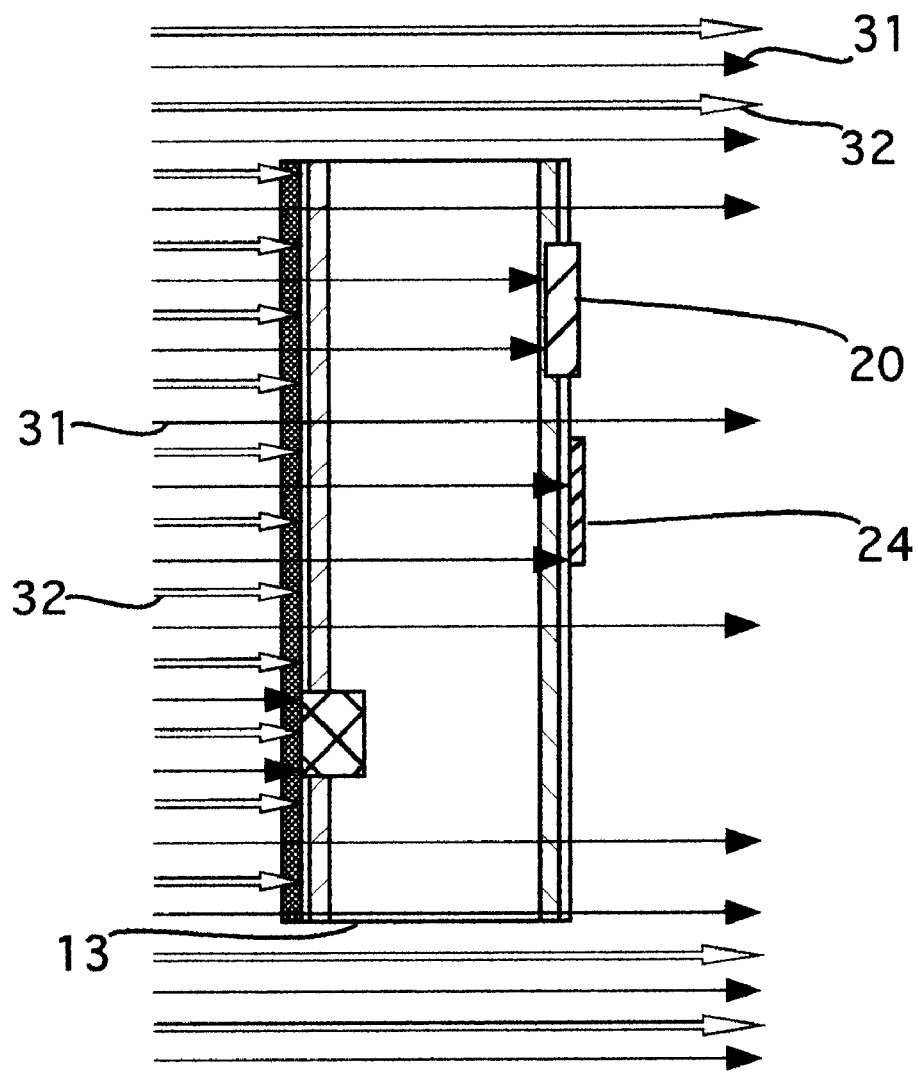
FIG. 7 is a cross-sectional view of the transaction card of FIG. 1, with the thickness of the card being exaggerated with respect to the height of the card, with hollow and solid arrows illustrating the permeability of the card to light in the infrared and humanly visible portions of the spectrum, respectively.

FIG. 7 illustrates the light permeability of a complete card. As can be seen, it would be detected by a sensor in most card reading machines.

In FIGS. 6 and 7 the infrared light is represented as being stopped at the plastic laminate layer of the card base. In reality, the infrared light passes through that layer and is at least partially blocked at the first infrared barrier layer. That portion of the infrared light which is able to pass the first infrared barrier layer is blocked by the second infrared barrier layer.

Figure 8:
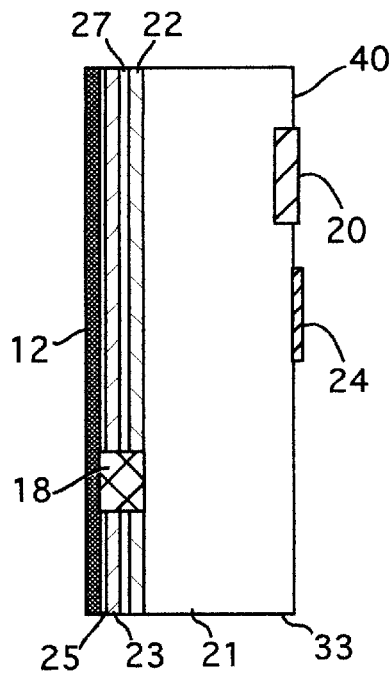
FIG. 8 is a cross-sectional view of a second embodiment of the invention, with the thickness of the card being exaggerated with respect to the height of the card.

FIG. 8 illustrates a second embodiment 40 of the invention. In this embodiment, first infrared barrier layer 22 is disposed on either the front or rear surface of card core 21. In FIG. 8 it is shown deposited on that surface of the card core which is adjacent to the front surface of the completed card. A clear buffer layer 27 is deposited over the first infrared barrier layer. The buffer layer may be a plastic laminate or a clear ink. Second infrared barrier layer 23 is then deposited over the buffer layer. Protective layer 25 is disposed over second infrared barrier layer 23 to complete card base 33. A credit card is formed from card base 33 by embedding magnetic strip 20 in, and apply signature strip 24 on, the rear surface of the card base, embedding computer chip 18 in the front surface of the card base, and printing front layer 12 over protective layer 25.

Figure 9:
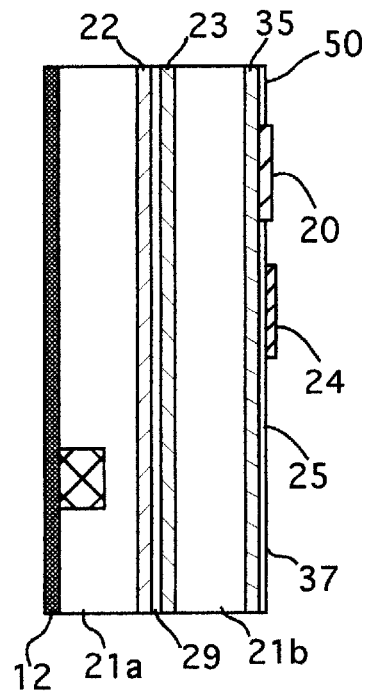
FIG. 9 is a cross-sectional view of a third embodiment of the invention, with the thickness of the card being exaggerated with respect to the height of the card.

FIG. 9 illustrates a third embodiment 50 of the invention. In this embodiment, the card base 37 is comprised of first card core 21a having first infrared barrier layer 22 disposed on its rear surface, a second card core 21b having second infrared barrier layer 23 disposed on its front surface and third infrared barrier layer 35 disposed on its rear surface, and a clear buffer layer 29 disposed between the first and second barrier layers. Buffer layer 29 may be an adhesive holding the tow card cores together. Card base 37 may also comprise a protective layer 25 disposed over the third infrared barrier layer.

Figure 11:
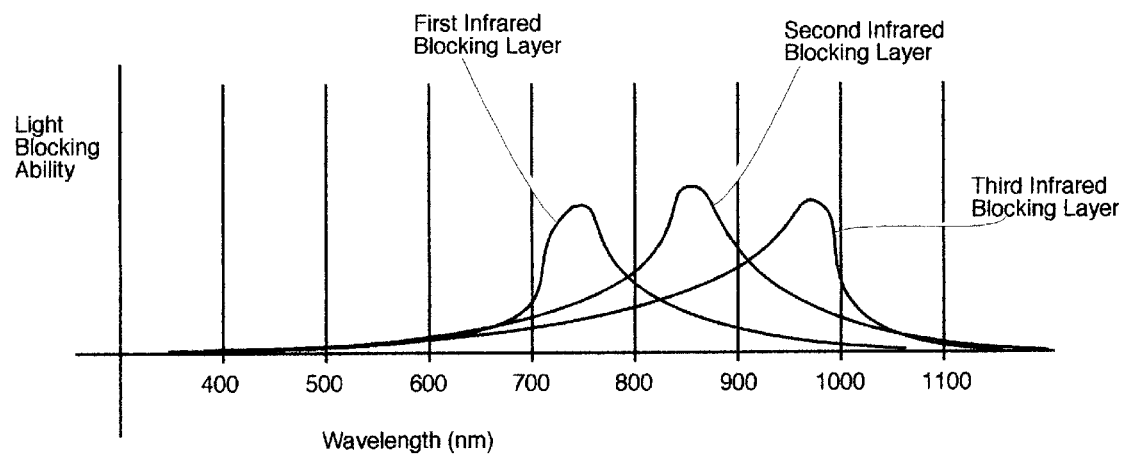
FIG. 11 is a graph representing light blocking abilities of different infrared barrier layers.

The use of three or more infrared barrier layers may be desired when effective blocking of the desired range of infrared wavelengths may be blocked more efficiently with a higher number of such barrier layers. By way of example, the most cost efficient manufacture of a card base blocking infrared light having wavelengths in the range from 720 nm to 1000 nm may involve the use of infrared barrier layers having the infrared blocking response curves shown in FIG. 11.

As shown in the drawings, it is typically preferred that the first and second infrared barrier layers be separated apart from each other so as to prevent the reaction of their respective components with each other. If three or more infrared barrier layers are used, it is preferred that each infrared barrier layer be maintained separated apart from each of the other infrared barrier layers.

Figure 10:
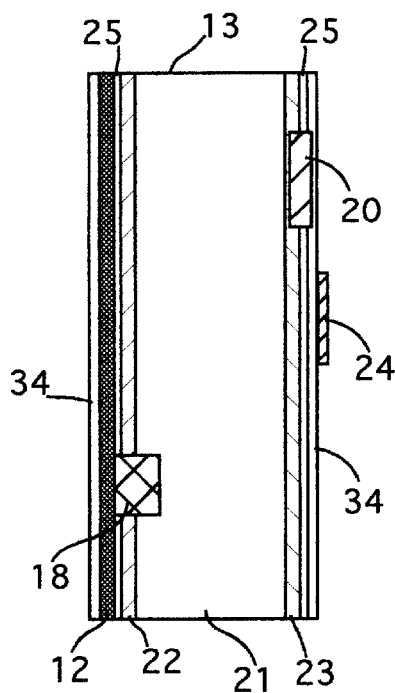
FIG. 10 is a cross-sectional view of a fourth embodiment of the invention, with the thickness of the card being exaggerated with respect to the height of the card.

FIG. 10 illustrates a fourth embodiment 60 of the invention. It includes additional transparent protection layers 34 which are disposed on the front and rear surfaces of the card in the conventional manner.

Each of the embodiments illustrated in FIGS. 8–10 have the same light permeability characteristics as the embodiment illustrated in FIGS. 1, 2, 3, 4 and 5, and can be detected by card reading machines in the same manner.

The inventor has also discovered an economical and efficient method for making a transaction card substantially opaque in the infrared range of the spectrum while retaining the property of its being transparent to the human eye. That method is to form a card core in any of the manners known in the art for making card bases, using transparent plastic material rather than the commonly used white plastic material, and to coat substantially the entirety of at least one surface of the card core with at least two infrared barrier layers. In coating the infrared barrier layers on to the core, it is preferred that the infrared barrier layers be maintained separated apart from each other, such as by coating a buffer layer over one of the infrared barrier layers or by coating the infrared barrier layers on opposite surfaces of the core. The coating of the infrared barrier layers on to the core may be done by conventional methods of printing on cards, such as offset lithography or silkscreening. In the preferred embodiment, first and second infrared barrier layers are coated on separate surfaces of the card core, with the first infrared barrier layer blocking infrared light in first range of infrared wavelengths and the second infrared barrier layer blocking infrared light in a second range of infrared wavelengths. The first and second ranges of infrared wavelengths may overlap with each other. If necessary or desired, additional infrared barrier layers, each with property of blocking a range of infrared wavelengths, may be coated on to the core until a predetermined range of wavelengths of infrared light (e.g., the range of about 720 nm to about 1000 nm) would be blocked by the card core. The card core is now the card base, and this card base is then processed in the conventional manner to make a credit card, membership card, identification card or similar transaction card.

It will be understood that various changes of the details, materials, steps, arrangement of parts and uses which have been herein described and illustrated in order to explain the nature of the invention will occur to and may be made by those skilled in the art, and such changes are intended to be included within the scope of this invention.

I claim the following:

1. A card base for a transaction card, said card base comprising a core formed of substantially transparent plastic and a plurality of infrared barrier layers disposed on a said core, each of said infrared barrier layers being substantially transparent to the human eye.

2. The card base of claim 1 wherein said plurality of infrared barrier layers in the aggregate block infrared light having wavelengths in the range from about 750 nm to about 1000 nm.

3. The card base of claim 1 wherein said plurality of infrared barrier layers in the aggregate block infrared light having wavelengths in the range from about 740 nm to about 940 nm.

4. The card base of claim 1 wherein said plurality of infrared barrier layers in the aggregate block infrared light having wavelengths in the range from about 720 nm to about 1000 nm.

5. The card base of claim 1 wherein each of said infrared barrier layers is formed from a transparent liquid vehicle mixed with an infrared blocking agent.

6. The card base of claim 5 wherein said transparent liquid vehicle is selected from the group of transparent dyes, transparent inks, transparent solvents and transparent varnishes.

7. The card base of claim 5 wherein said infrared blocking agent is an infrared absorbing dye.

8. The card base of claim 1 wherein said plurality of infrared barrier layers includes a first infrared barrier layer and a second infrared barrier layer and wherein said first and second infrared barrier layers are maintained separated apart from each other.

9. The card base of claim 8 wherein said first infrared barrier layer comprises dibutyl amino thpenyl benzene, hexa antimonate dye and said second infrared barrier layer comprises benz[e]indol cyanine dye.

10. The card base of claim 8 wherein each of said first and second infrared barrier layers is about 56 microns thick when applied wet.

11. A card base for a transaction card, said card base comprising a core formed of transparent plastic, a first infrared barrier layer disposed on a first surface of said core and a second infrared barrier layer disposed on a second surface of said core.

12. The card base of claim 11 wherein said first infrared barrier layer blocks infrared light in a first range of wavelengths and said second infrared barrier layer blocks infrared light in a second range of wavelengths.

13. The card base of claim 12 wherein said first range of wavelengths overlaps with said second range of wavelengths.

14. The card base of claim 13 wherein said first and second barrier layers together block infrared light in a range extending from about 750 nm to about 1000 nm.

15. The card base of claim 13 wherein said first and second barrier layers together block infrared light in a range extending from about 740 nm to about 940 nm.

16. The card base of claim 13, herein said plurality of infrared barrier layers together block infrared light having wavelengths in the range from about 720 nm to about 1000 nm.

17. The card base of claim 11 wherein each of said first and second infrared barrier layers is disposed on said core by silkscreening.

18. The card base of claim 11 wherein a third infrared barrier layer is disposed on said core, wherein said third infrared layer blocks infrared light in a third range of wavelengths.

19. The card base of claim 11 wherein said first infrared barrier layer is formed of a transparent liquid vehicle and an infrared blocking agent.

20. The card base of claim 11 wherein each of said first and second infrared barrier layers is formed of a transparent liquid vehicle and an infrared blocking agent.

21. The card base of claim 20 wherein said first infrared barrier layer comprises dibutyl amino thpenyl benzene, hexa antimonate dye and said second infrared barrier layer comprises benz[e]indol cyanine dye.

22. The card base of claim 11 wherein each of said first and second infrared barrier layers is about 56 microns thick when applied wet.

23. A transaction card comprising a transparent card core and first and second infrared barrier layers each of which is coextensive with substantially the entire area of the transaction card.

24. The transaction card of claim 23 wherein said first and second infrared barrier layers are maintained separated apart from each other.

25. The transaction card of claim 24 wherein said first infrared barrier layer blocks infrared light in a first range of wavelengths and said second infrared barrier layer blocks infrared light in a second range of wavelengths.

26. The transaction card of claim 25 wherein said first range of wavelengths overlaps with said second range of wavelengths.

27. The transaction card of claim 25 wherein said first and second barrier layers together block infrared light in a range extending from about 750 nm to about 1000 nm.

28. The transaction card of claim 25 wherein said first and second barrier layers together block infrared light in a range extending from about 740 nm to about 940 nm.

29. The transaction card of claim 25 wherein said first and second barrier layers together block infrared light in a range extending from about 720 nm to about 1000 nm.

30. The transaction card of claim 25 wherein each of said first and second infrared barrier layers is formed of a transparent liquid vehicle and an infrared blocking agent.

31. The transaction card of claim 25 wherein said first infrared barrier layer comprises dibutyl amino thpenyl benzene, hexa antimonate dye and said second infrared barrier layer comprises benz[e]indol cyanine dye.

32. The transaction card of claim 25 wherein each of said first and second infrared barrier layers is disposed on said core by silkscreening.

33. The transaction card of claim 25 wherein a third infrared barrier layer is disposed on said core, wherein said third infrared layer blocks infrared light in a third range of wavelengths.

34. A method for making a card base for a transaction card which is at least in part substantially transparent to humanly visible light and which is detectable by card readers which use infrared light in connection with detecting the presence of such a card, said method comprising the following steps:

(a) forming a card core of transparent material; and (b) coating substantially the entirety of at least a first surface of said card core with a plurality of infrared barrier layers.

35. A method for making a card base for a transaction card which is at least in part substantially transparent to humanly visible light and which is detectable by card readers which use infrared light in connection with detecting the presence of such a card, said method comprising the following steps:

(a) forming a card core of transparent material; and (b) coating substantially the entirety of a first surface of said card core with a first infrared barrier layer; and (c) coating substantially the entirety of a second surface of said card core with a second infrared barrier layer.

36. The method of claim 35 wherein said first infrared barrier layer blocks infrared light in a first range of wavelengths and said second infrared barrier layer blocks infrared light in a second range of wavelengths.

37. The transaction card of claim 36 wherein said first range of wavelengths overlaps with said second range of wavelengths.

38. The method of claim 36, further including the step of forming each infrared barrier layer by mixing an infrared blocking agent with a transparent liquid vehicle.

39. The method of claim 38 wherein said transparent liquid vehicle is selected from the group of transparent dyes, transparent inks, transparent solvents and transparent varnishes.

40. The method of claim 35 wherein said first infrared barrier layer comprises dibutyl amino thpenyl benzene, hexa antimonate dye and said second infrared barrier layer comprises benz[e]indol cyanine dye.

41. The method of claim 35 wherein said coating steps are accomplished by silkscreening.

42. The method of claim 41 wherein each of said first and second infrared barrier layers is coated about 56 microns thick when wet on said first and second surfaces, respectively.

43. A method for making a transaction card which is at least in part substantially transparent to humanly visible light and which is detectable by card readers which use infrared light in connection with detecting the presence of such a card, said method comprising the following steps:

(a) forming a card core of transparent material; and (b) applying a first infrared barrier layer to said core, wherein said first infrared barrier layer blocks infrared light in a first range of wavelengths; and (c) applying a second infrared barrier layer to said core, wherein said second infrared barrier layer blocks infrared light in a second range of wavelengths.

44. The method of claim 43 wherein said first and second infrared barrier layers are maintained separate from each other.

45. The method of claim 44 wherein said first infrared barrier layer comprises dibutyl amino thpenyl benzene, hexa antimonate dye and said second infrared barrier layer comprises benz[e]indol cyanine dye.

46. The method of claim 44 wherein said first and second infrared barrier layers is applied about 56 microns thick when wet to said core.

* * * * *